United States Patent [19]

Hegyi

[11] 4,040,964
[45] Aug. 9, 1977

[54] ADJUSTABLE CONTAINER STRAINER AND HANDLE

[76] Inventor: Eugenia Hegyi, 2477 W. Lincoln, Apt. 49, Anaheim, Calif. 92801

[21] Appl. No.: 698,526

[22] Filed: June 22, 1976

[51] Int. Cl.² .............................................. B01D 35/28
[52] U.S. Cl. ................................... 210/238; 210/244; 210/464; 210/469; 210/470
[58] Field of Search ............... 210/232, 237, 238, 469, 210/470, 474, 478, 464, 244

[56] References Cited

U.S. PATENT DOCUMENTS

| 200,976 | 3/1918 | Campbell | 210/469 |
|---|---|---|---|
| 688,397 | 12/1901 | Des Isles | 210/469 |
| 695,593 | 3/1902 | Warner | 210/469 |
| 1,058,146 | 4/1913 | Burdin | 210/469 |
| 1,137,896 | 5/1915 | Poundstone | 210/469 |
| 1,219,779 | 3/1917 | Roe | 210/469 |
| 1,241,448 | 9/1917 | Sherman | 210/469 |
| 1,395,951 | 11/1921 | Ferdon | 210/470 |
| 2,133,724 | 10/1938 | Smylski | 210/469 |
| 2,499,016 | 2/1950 | Buckley | 210/469 |
| 3,289,849 | 12/1966 | Livingston et al. | 210/469 |

*Primary Examiner*—Theodore A. Granger
*Attorney, Agent, or Firm*—Eugene V. Mandel

[57] ABSTRACT

An adjustable container strainer and handle including means for securing the same to various food containers such as cans and a handle to permit easier handling thereof.

4 Claims, 3 Drawing Figures

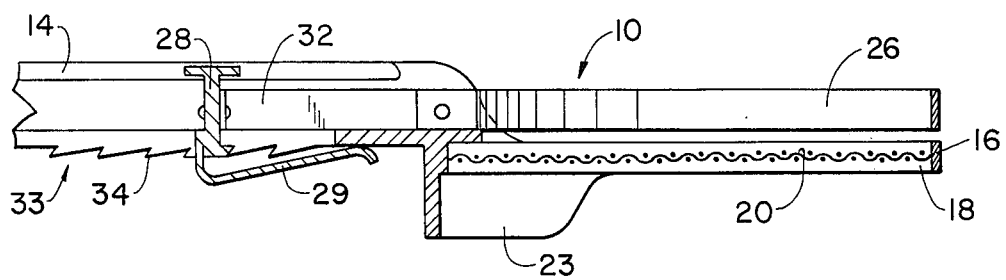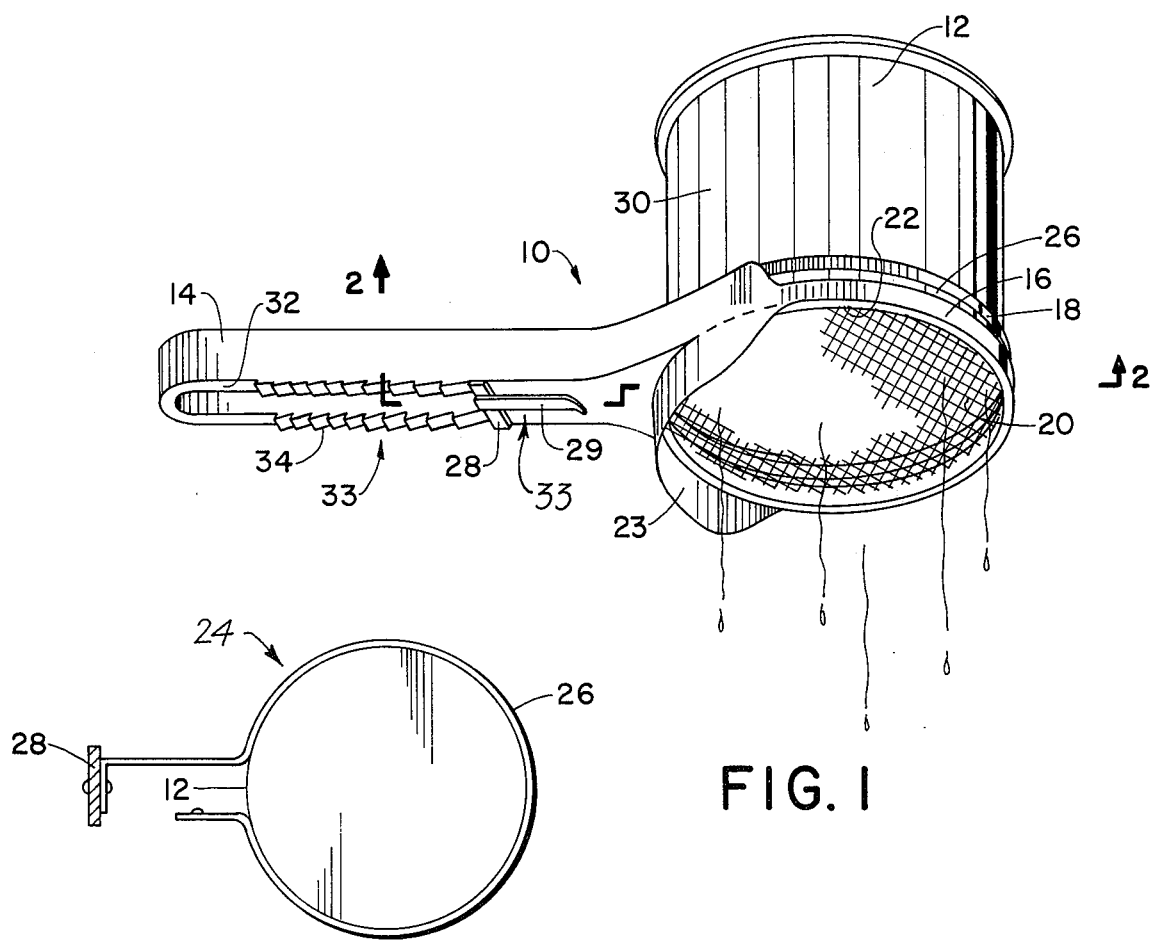

ADJUSTABLE CONTAINER STRAINER AND HANDLE

BACKGROUND OF THE INVENTION

1. Field of the Invention

The present invention relates to strainers, and more particularly, to a strainer and handle adjustably affixable to various sizes and types of food containers such as cans.

2. Description of the Prior Art

The prior art includes several strainers that may be attached to containers to facilitate the separation of liquids from solids therein. Heretofore, proposed strainers included different types of affixing means for securing the same to a container. However, at best the strainers are loosely affixed and may separate from the containers when used. Also, the size of containers that can be accommodated are limited.

In the U.S. Pat. No. 1,241,448 to Sherman issued Sept. 25, 1917 a straining device that clips over the mouth of a container and is secured by a spring urging the clips against the rim thereof is disclosed. Also provided, is a handle member adapted to be used to manipulate the container. The strainer can easily become disengaged from the container by forcing the spring open if the contents in the container are heavy or if the strainer is accidentally slipped to one side thereon.

Further included in the prior art is an adjustable strainer having a flat central portion including holes therein and a spring means for affixing the central portion to the mouth of a container as disclosed in the U.S. Pat. No. 3,289,849 to Livingston et al issued Dec. 6, 1966. A gripping surface is also provided but it is insufficient in size and shape to be used as a handle for maneuvering the container affixed thereto.

The present invention overcomes the problems of the prior art by providing a flexible band element that is secured and locked around the sides of the container thereby securely affixing the strainer thereto and includes a handle element for permitting easy manipulation of the container.

SUMMARY OF THE INVENTION

Therefore, it is a primary object of the present invention to provide an adjustable container strainer and handle which may be used with various types and sizes of containers.

A further object is to provide securing means which positively and firmly secures the adjustable container strainer and handle to a container.

A still further object is to provide a handle element for permitting easy manipulation of the container without the possibility of the container becoming detached therefrom.

Another object is to provide a deflector element which prevents draining liquids from spilling on the user.

These objects, as well as further objects and advantages, of the present invention will become readily apparent after reading the description of a non-limiting illustrative embodiment and the accompanying drawings.

An adjustable container strainer and handle according to the principles of the present invention includes a handle element, a strainer element affixed to the handle element, securing means for adjustably securing the strainer element over the mouth of a container permitting the straining of the contents therein by the tilting thereof.

BRIEF DESCRIPTION OF THE DRAWINGS

In order that the present invention may be more fully understood it will now be described, by way of example, with reference to the accompanying drawings in which:

FIG. 1 illustrates a pictorial representation of the preferred embodiment of the present invention secured on to a typical container;

FIG. 2 illustrates a sectional view of the preferred embodiment taken substantially along the line 2—2 of FIG. 1; and FIG. 3 illustrates a top view of the securing means.

DESCRIPTION OF THE PREFERRED EMBODIMENT

Referring now to the figures, and more particularly, to FIG. 1 there is illustrated therein the preferred embodiment of the present invention, an adjustable container strainer and handle 10 secured on to a typical container 12. The adjustable container strainer and handle 10 includes a handle element 14 and a strainer element 16 having a preferably circular ring shaped frame 18 and straining screen material 20 disposed within the central opening 22 of the frame 18. The longitudinal axis of the handle element 14 is preferably perpendicular to the central axis of the strainer element 16. A deflector element 23 is affixed to the strainer element 16 adjacent to the handle element 14 protecting the user from draining liquids.

Securing means 24 including a flexible band element 26 and an arm 28 having a tongue 29 are illustrated. The flexible band element 26 is adapted to circumscribe the outer walls 30 of the container 12 and is affixed on one end to the handle element 14 and on the other end to the arm 28 which is slidably disposed within an elongated cavity 32 within the handle element 14 as shown in FIG. 2. Locking means 33 including a multiplicity of protrusions 34 adapted to engage the arm member 28 and the tongue member 29 thereof thereagainst are affixed to the handle element 14.

As the arm 28 is moved away from the strainer element 16 the band element 26 is tensioned around the container 12 as shown in FIG. 3. The arm 28 is then engaged by a protrusion 34 locking the same in position and securing the adjustable container strainer and handle 10 thereto. The container can be inverted or tilted thereby draining the liquid therefrom.

The screen material 20 is preferably constructed of a fine meshed stainless steel. The handle element 14, the frame 18, and the deflector element 23 are preferably constructed of plastic.

It will be understood that various changes in the details, materials, arrangements of parts and operating conditions which have been herein described and illustrated in order to explain the nature of the invention may be made by those skilled in the art within the principles and scope of the invention.

Having thus set forth the nature of the invention, what is claimed is:

1. An adjustable container strainer and handle comprising:
   a. a handle element;
   b. a trainer element affixed to said handle element; and
   c. securing means for adjustably securing said strainer element over the mouth of a container permitting the straining of contents therein by the tilting thereof; said securing means comprises a flexible band element adapted to circumscribe the outer walls of a container and being affixed on one end to said handle element and on the other end to an arm having a tongue member slidably disposed within an elongated cavity within said handle element providing the tensioning of said flexible band element by the movement of said arm away from said container; and d. locking means for locking the arm in position within the handle element thereby locking said container strainer and handle over the mouth of said container; the locking means comprising a multiplicity of protrusions affixed to said handle adapted to engage said arm and said tongue member and secure the same thereagainst.

2. The adjustable container strainer and handle according to claim 1, wherein the longitudinal axis of said handle element is perpendicular to the central axis of said strainer element.

3. The adjustable container strainer according to claim 1, wherein said strainer element further comprises a deflector element affixed thereon adjacent to said handle element.

4. The adjustable container strainer according to claim 1, wherein said straining element comprises a circular ring shaped frame having straining screen material disposed within the central opening thereof.

* * * * *